US012756606B2

(12) United States Patent
Lin et al.

(10) Patent No.: US 12,756,606 B2
(45) Date of Patent: Oct. 6, 2026

(54) TRANSCEIVER DEVICE AND METHOD THEREOF

(71) Applicant: REALTEK SEMICONDUCTOR CORP., Hsinchu (TW)

(72) Inventors: Wei-Cheng Lin, Hsinchu (TW); Ching-Her Huang, Hsinchu (TW); Ren-Hong Yen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 36 days.

(21) Appl. No.: 19/092,469

(22) Filed: Mar. 27, 2025

(65) Prior Publication Data

US 2025/0310161 A1 Oct. 2, 2025

(30) Foreign Application Priority Data

Mar. 29, 2024 (TW) .................................. 113112211

(51) Int. Cl.
*H04L 27/152* (2006.01)
*H04L 27/12* (2006.01)
*H04L 27/148* (2006.01)

(52) U.S. Cl.
CPC ............ *H04L 27/152* (2013.01); *H04L 27/12* (2013.01); *H04L 27/148* (2013.01)

(58) Field of Classification Search
CPC ...... H04L 27/152; H04L 27/12; H04L 27/148
See application file for complete search history.

(56) References Cited

U.S. PATENT DOCUMENTS

| | | | | |
|---|---|---|---|---|
| 7,492,195 | B1 | 2/2009 | Patil | |
| 7,764,934 | B2 * | 7/2010 | Jensen | H03L 7/18 455/76 |
| 9,484,935 | B2 | 11/2016 | Shanan et al. | |
| 11,264,995 | B1 * | 3/2022 | Chao | H03B 19/14 |
| 11,336,288 | B1 * | 5/2022 | Pai | H03L 7/0891 |
| 2021/0297296 | A1 * | 9/2021 | Syllaios | H04B 1/403 |

FOREIGN PATENT DOCUMENTS

| | | | |
|---|---|---|---|
| TW | I685205 | B | 2/2020 |
| TW | I697210 | B | 6/2020 |
| WO | WO 94/20888 | A2 | 9/1994 |

* cited by examiner

*Primary Examiner* — Dac V Ha
(74) *Attorney, Agent, or Firm* — Birch, Stewart, Kolasch & Birch, LLP

(57) ABSTRACT

A transceiver device includes a conversion circuit, a phase-locked loop, a transmission processing circuit, a reception processing circuit, and a selection circuit. The conversion circuit performs a digital-to-analog conversion for a modulation data to generate a first control signal. The phase-locked loop includes a control circuit and a voltage-controlled oscillator. The control circuit generates a second control signal according to the modulation data, a reference signal, and a frequency signal. The voltage-controlled oscillator determines an oscillation frequency according to the first control signal and the second control signal to generate the frequency signal. The transmission processing circuit performs a transmission processing according to the frequency signal. The reception processing circuit performs a reception processing according to the frequency signal. The selection circuit selectively transmits the frequency signal to the transmission processing circuit or the reception processing circuit according to the modulation data.

20 Claims, 11 Drawing Sheets

TRANSCEIVER DEVICE AND METHOD THEREOF

CROSS-REFERENCE TO RELATED APPLICATION

This non-provisional application claims priority under 35 U.S.C. § 119(a) to Patent Application No. 113112211 filed in Taiwan, R.O.C. on Mar. 29, 2024, the entire contents of which are hereby incorporated by reference.

BACKGROUND

Technical Field

The present disclosure relates to signal transmission and reception technology, and in particular, to a transceiver device and a method thereof capable of fast frequency hopping in a wide transmission band range.

Related Art

Generally, the loop bandwidth of a phase-locked loop may affect the locking speed of the phase-locked loop. In order to meet the application requirements of a Bluetooth system, the loop bandwidth of the phase-locked loop cannot be pulled up beyond a certain range, which limits the locking speed of the phase-locked loop, and thus limits the frequency switching speed of the Bluetooth system.

SUMMARY

In an embodiment, a transceiver device includes a conversion circuit, a phase-locked loop, a transmission processing circuit, a reception processing circuit, and a selection circuit. The conversion circuit is configured to generate a first control signal according to a modulation data. The phase-locked loop is configured to generate a frequency signal according to the modulation data, the first control signal, and a reference signal. The phase-locked loop includes a control circuit and a voltage-controlled oscillator. The control circuit is configured to generate a second control signal for frequency adjustment according to the modulation data, a reference signal, and a frequency signal. The voltage-controlled oscillator is configured to determine an oscillation frequency according to the first control signal and the second control signal to generate the frequency signal with the oscillation frequency. The transmission processing circuit is configured to perform a transmission processing according to the frequency signal. The reception processing circuit is configured to perform a reception processing according to the frequency signal. The selection circuit is configured to selectively transmit the frequency signal to the transmission processing circuit or the reception processing circuit according to the modulation data.

In an embodiment, a transceiver method includes: performing a digital-to-analog conversion for a modulation data to generate a first control signal; generating a second control signal for frequency adjustment according to a reference signal, a frequency signal, and the modulation data by using a control circuit of a phase-locked loop; determining an oscillation frequency according to the first control signal and the second control signal by using a voltage-controlled oscillator of the phase-locked loop to generate the frequency signal with the oscillation frequency; and transmitting the frequency signal to a transmission processing circuit according to the modulation data to perform a transmission processing according to the frequency signal by using the transmission processing circuit, or transmitting the frequency signal to a reception processing circuit according to the modulation data to perform a reception processing according to the frequency signal by using the reception processing circuit.

Based on the above, according to the transceiver device and the transceiver method in any embodiment, the oscillation frequency of the voltage-controlled oscillator is adjusted according to the first control signal generated by the conversion circuit according to the modulation data and the second control signal generated according to the modulation data by the control circuit, so that the phase-locked loop can be locked more quickly. In this way, the transceiver device can quickly switch its working frequency and/or operating mode in a wide transmission band range.

The detailed features and advantages of the present disclosure are set forth in the detailed description of the implementation of the present disclosure, the content of which is sufficient for any person skilled in the art to understand the technical content of the present disclosure and implement it based thereon. According to the content disclosed in this specification, claims and drawings, any person skilled in the art can easily understand the objectives and advantages associated with the present disclosure.

DETAILED DESCRIPTION

To make the foregoing objectives, features, and advantages of the embodiments of the present disclosure more apparent and easier to understand, the present disclosure will be described in detail below with reference to the accompanying drawings.

It should be understood that the term "including" used in this specification is used to indicate the existence of specific technical features, values, method steps, operation processing, elements, and/or components, but does not exclude the addition of more technical features, values, method steps, operation processing, elements, components, or any combination of the above.

Figure 1:
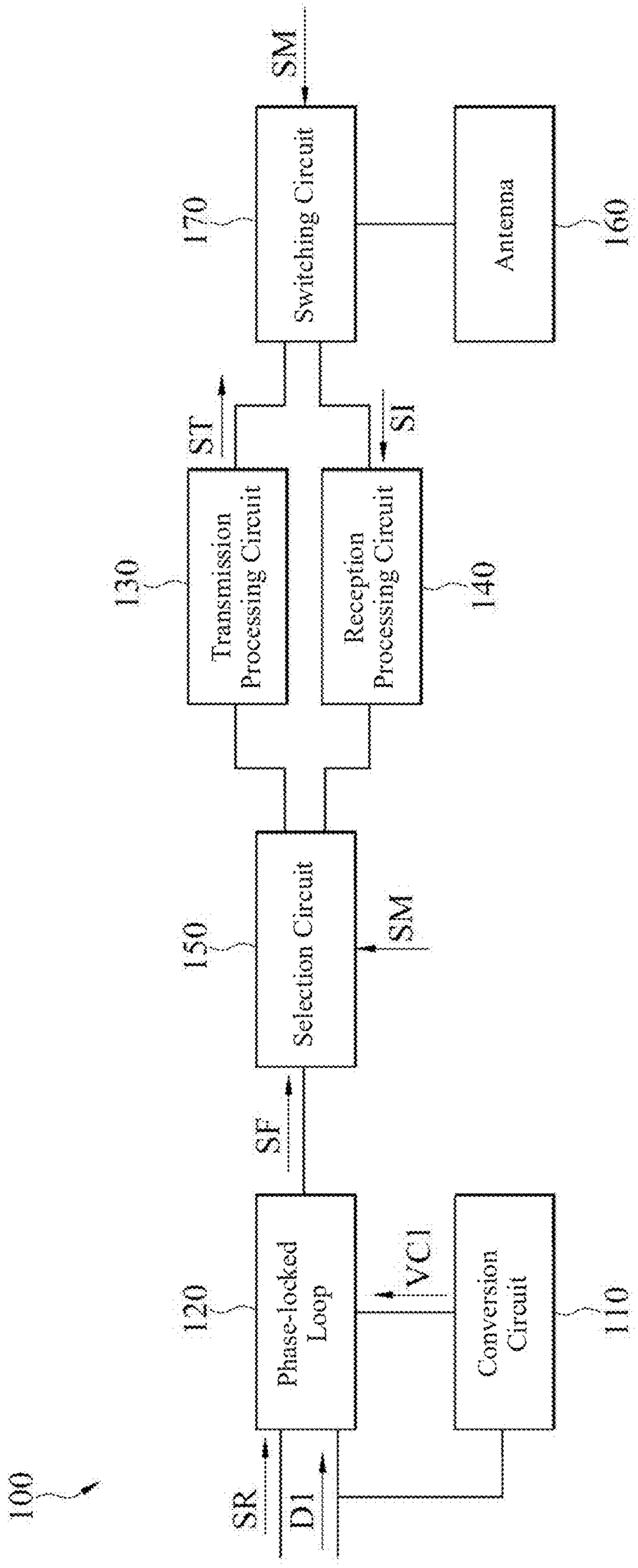
FIG. 1 is a schematic block diagram of a transceiver device according an embodiment.

FIG. 1 is a schematic block diagram of a transceiver device 100 according an embodiment. Referring to FIG. 1, the transceiver device 100 is capable of quickly switching its working frequency and/or operating mode in a transmission band by implementing a transceiver method according to an embodiment. In some embodiments, the transceiver device 100 may be a Bluetooth transceiver. The transmission band may be an industrial scientific medical band (ISM band), i.e., 2400 MHz to 2483.5 MHz, or another band. In addition, the operating mode of the transceiver device 100 may include a transmitter mode and a receiver mode. In some embodiments, the transmission band may be divided into 40 channels with a channel spacing of 2 MHz. The first channel is 2402 MHz, and the last channel is 2480 MHz.

In some embodiments, the transceiver device 100 includes a conversion circuit 110, a phase-locked loop 120, a transmission processing circuit 130, a reception processing circuit 140, and a selection circuit 150. The phase-locked loop 120 is coupled to the conversion circuit 110, and the selection circuit 150 is coupled between the phase-locked loop 120, the transmission processing circuit 130, and the reception processing circuit 140.

In some embodiments, an input terminal of the conversion circuit 110 is coupled to a digital input stage (not shown) to receive a modulation data D1 from the digital input stage. The conversion circuit 110 is configured to perform a digital-to-analog conversion for the modulation data D1 to generate a first control signal VC1. A reference input terminal of the phase-locked loop 120 is coupled to a pre-stage circuit (not shown) to receive a reference signal SR from the pre-stage circuit. A first control terminal of the phase-locked loop 120 is coupled to an output terminal of the conversion circuit 110 to receive the first control signal VC1 from the conversion circuit 110. A second control terminal of the phase-locked loop 120 is coupled to a digital input stage (not shown) to receive the modulation data D1 from the digital input stage. The phase-locked loop 120 is configured to generate a frequency signal SF according to the reference signal SR, the first control signal VC1, and the modulation data D1. An input terminal of the selection circuit 150 is coupled to an output terminal of the phase-locked loop 120 to receive the frequency signal SF from the phase-locked loop 120. A first connecting terminal of the selection circuit 150 is coupled to the transmission processing circuit 130. A second connecting terminal of the selection circuit 150 is coupled to the reception processing circuit 140. A control terminal of the selection circuit 150 is coupled to the digital input stage (not shown) to receive a mode signal SM from the digital input stage. The selection circuit 150 is configured to selectively establish a transmission path between the input terminal and the first connecting terminal according to the mode signal SM to transmit the frequency signal SF to the transmission processing circuit 130, or selectively establish a transmission path between the input terminal and the second connecting terminal according to the mode signal SM to transmit the frequency signal SF to the reception processing circuit 140.

In some embodiments, the transceiver device 100 may further include an antenna 160 and a switching circuit 170, and the switching circuit 170 is coupled between the antenna 160, the transmission processing circuit 130, and the reception processing circuit 140. A connecting terminal of the switching circuit 170 is coupled to the antenna 160. A first switching terminal of the switching circuit 170 is coupled to the transmission processing circuit 130. A second switching terminal of the switching circuit 170 is coupled to the reception processing circuit 140. A control terminal of the switching circuit 170 is coupled to the digital input stage (not shown) to receive the mode signal SM from the digital input stage. The switching circuit 170 is configured to selectively establish a transmission path between the connecting terminal and the first switching terminal according to the mode signal SM such that a transmission signal ST from the transmission processing circuit 130 can be transmitted via the antenna 160, or selectively establish a transmission path between the connecting terminal and the second switching terminal according to the mode signal SM such that the reception processing circuit 140 can receive a reception signal SI via the antenna 160.

In some embodiments, the conversion circuit 110 may be, but not limited to, a digital-to-analog converter. In addition, the selection circuit 150 and the switching circuit 170 may be, but not limited to, multiplexers. It is worth noting that in order to clearly explain the present disclosure, FIG. 1 in the present disclosure is a reduced block diagram, which only shows elements related to the present disclosure. It should be understood by those skilled in the art that the transceiver device 100 may include other elements for providing specific functions.

Figure 2:
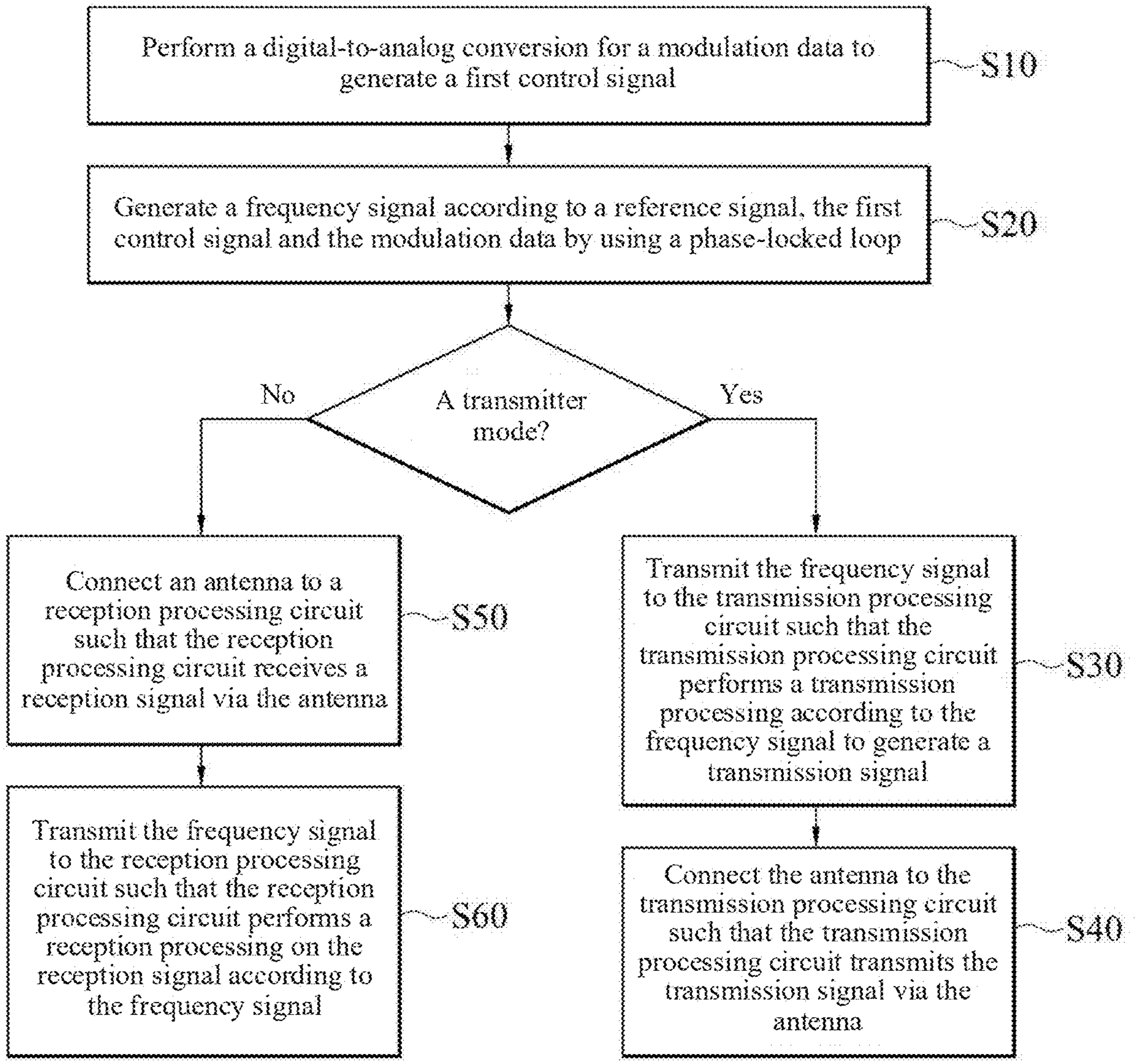
FIG. 2 is a schematic flowchart of a transceiver method according an embodiment.

FIG. 2 is a schematic flowchart of a transceiver method according an embodiment. Referring to FIG. 1 and FIG. 2, in some embodiments, the transceiver device 100 may perform a digital-to-analog conversion for a modulation data D1 by using a conversion circuit 110 to generate a first control signal VC1 (step S10), and the transceiver device 100 may generate a frequency signal SF according to a reference signal SR, the first control signal VC1, and the modulation data D1 by using a phase-locked loop 120 (step S20). After step S20, the transceiver device 100 may selectively: establish a transmission path between the phase-locked loop 120 and a transmission processing circuit 130 according to a mode signal SM by using a selection circuit 150 (at this time, the transmission path between the phase-locked loop 120 and the reception processing circuit 140 is open) to transmit the frequency signal SF to the transmission processing circuit 130 such that the transmission processing circuit 130 performs a transmission processing according to the frequency signal SF to generate a transmission signal ST (step S30), and establish a transmission path between an antenna 160 and the transmission processing circuit 130 according to the mode signal SM by using a switching circuit 170 (at this time, the transmission path between the antenna 160 and a reception processing circuit 140 is open) to connect the antenna 160 to the transmission processing circuit 130 such that the transmission processing circuit 130 can transmit the transmission signal ST via the antenna 160 (step S40). Alternatively, after step S20, the transceiver device 100 may further selectively: establish the transmission path between the antenna 160 and the reception processing circuit 140 according to the mode signal SM by using the switching circuit 170 (at this time, the transmission path between the antenna 160 and the transmission processing circuit 130 is open) to connect the antenna 160 to the reception processing circuit 140 such that the reception processing circuit 140 can receive a reception signal SI via the antenna 160 (step S50), and establish a transmission path between the phase-locked loop 120 and the reception processing circuit 140 according to the mode signal SM by using the selection circuit 150 (at this time, the transmission path between a voltage-controlled oscillator 122 and the transmission processing circuit 130 is open) to transmit the frequency signal SF to the reception processing circuit 140 such that the reception processing circuit 140 performs a reception processing on the reception signal SI according to the frequency signal SF (step S60).

Specifically, in step S10, the conversion circuit 110 may perform a digital-to-analog conversion for the modulation data D1 represented by a string of two bits to obtain the first control signal VC1 with a corresponding voltage size. In some aspects, the conversion circuit 110 may be implemented as a digital-to-analog converter.

Figure 3:
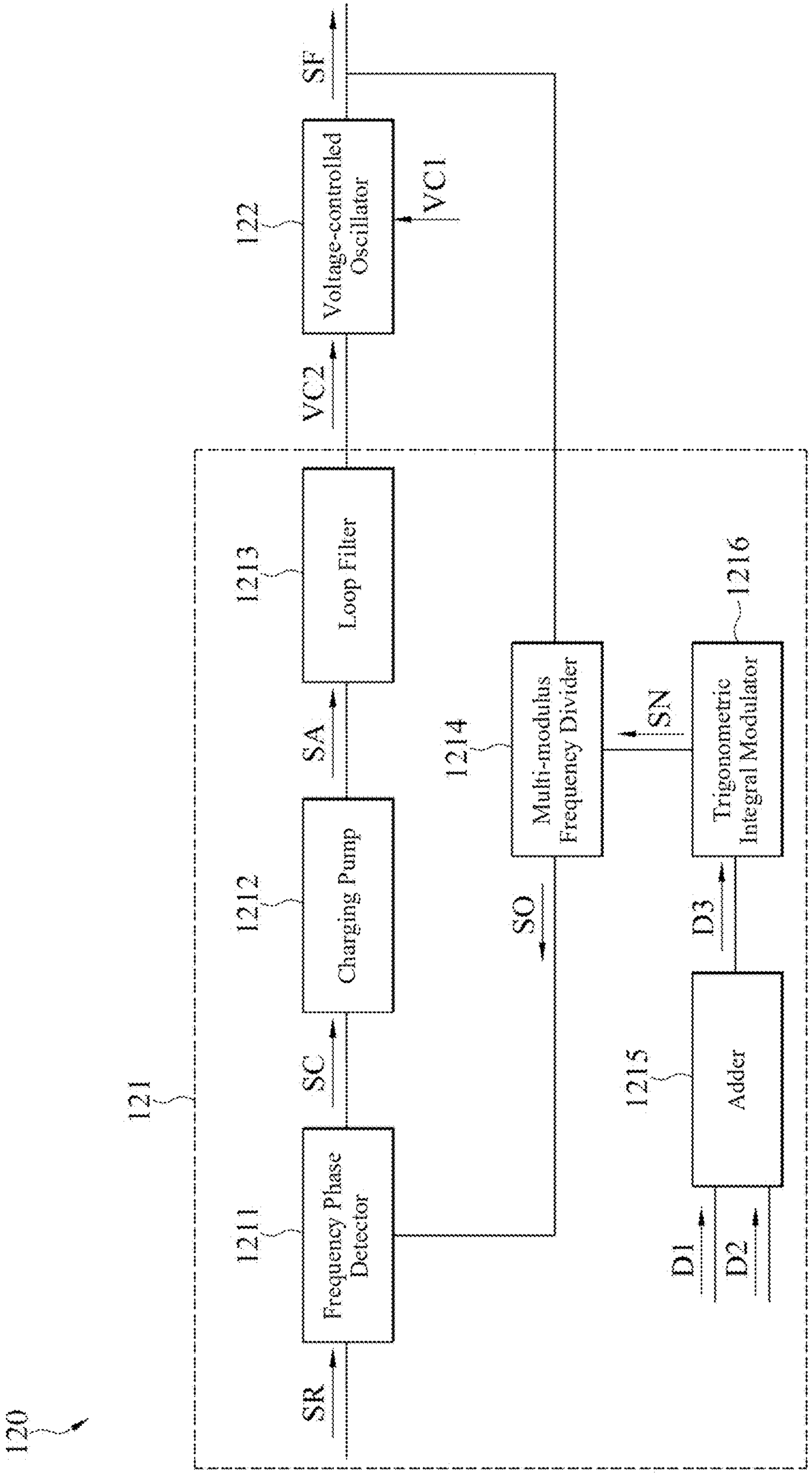
FIG. 3 is a schematic block diagram of a phase-locked loop according an embodiment.

FIG. 3 is a schematic block diagram of a phase-locked loop according an embodiment. Referring to FIG. 1 to FIG. 3, in some embodiments, the phase-locked loop 120 may include a control circuit 121 and the voltage-controlled oscillator 122. The voltage-controlled oscillator 122 is coupled between the control circuit 121, the conversion circuit 110, and the selection circuit 150, and the control circuit 121 is coupled to a pre-stage circuit (not shown) and a digital input stage (not shown).

Figure 4:
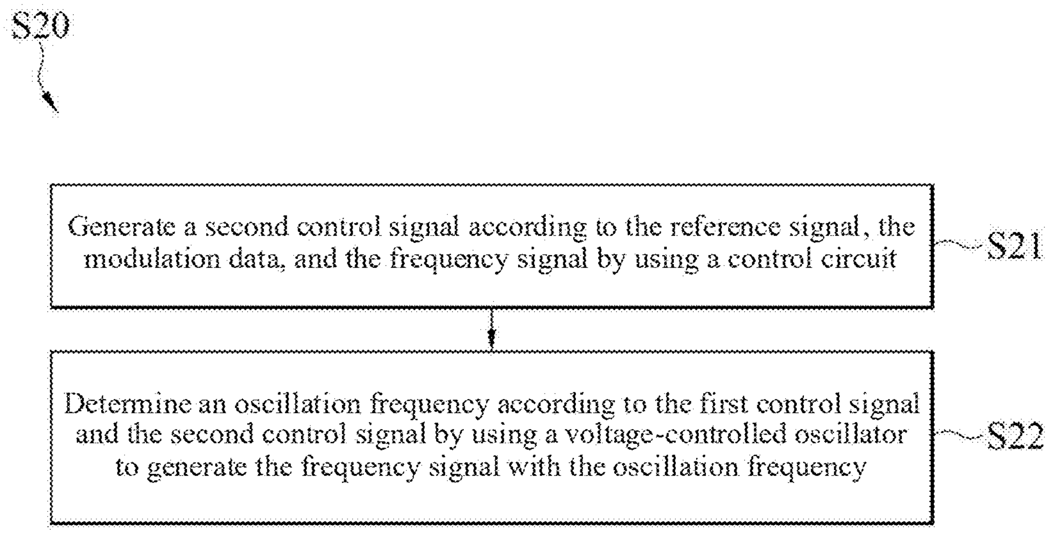
FIG. 4 is a schematic flowchart of step S20 according to an embodiment.

FIG. 4 is a schematic flowchart of step S20 according to an embodiment. Referring to FIG. 3 and FIG. 4, specifically, in step S20, the phase-locked loop 120 may generate a second control signal VC2 for adjusting an oscillation frequency of the voltage-controlled oscillator 122 according to the reference signal SR from the pre-stage circuit, the modulation data D1 from the digital input stage, and the frequency signal SF from the voltage-controlled oscillator 122 by using the control circuit 121 (step S21). In addition, the phase-locked loop 120 may determine an oscillation frequency according to the first control signal VC1 from the conversion circuit 110 and the second control signal VC2 from the control circuit 121 by using the voltage-controlled oscillator 122 to generate the frequency signal SF with the oscillation frequency (step S22). Therefore, the voltage-controlled oscillator 122 is controlled by both the first control signal VC1 and the second control signal VC2, so that the locking speed of the phase-locked loop 120 can be increased.

In some embodiments, the control circuit 121 may include a frequency phase detector 1211, a charging pump 1212, a loop filter 1213, and a multi-modulus frequency divider 1214. The multi-modulus frequency divider 1214 is coupled to the voltage-controlled oscillator 122, the digital input stage (not shown), and the frequency phase detector 1211. The frequency phase detector 1211 is coupled to the pre-stage circuit (not shown) and the charging pump 1212. The loop filter 1213 is coupled to the charging pump 1212 and the voltage-controlled oscillator 122.

In some embodiments, a feedback input terminal of the multi-modulus frequency divider 1214 is coupled to an output terminal of the voltage-controlled oscillator 122 to receive the frequency signal SF from the voltage-controlled oscillator 122. A control terminal of the multi-modulus frequency divider 1214 is coupled to the digital input stage to receive the modulation data D1 from the digital input stage. The multi-modulus frequency divider 1214 is configured to generate an output signal SO according to the modulation data D1 and the frequency signal SF. A first input terminal of the frequency phase detector 1211 is coupled to the pre-stage circuit to receive a reference signal SR from the pre-stage circuit. A second input terminal of the frequency phase detector 1211 is coupled to an output terminal of the multi-modulus frequency divider 1214 to receive the output signal SO from the multi-modulus frequency divider 1214. The frequency phase detector 1211 is configured to generate a comparison signal SC according to a reference signal SR and the output signal SO. An input terminal of the charging pump 1212 is coupled to an output terminal of the frequency phase detector 1211 to receive the comparison signal SC from the frequency phase detector 1211. The charging pump 1212 is configured to generate an adjustment signal SA according to the comparison signal SC. An input terminal of the loop filter 1213 is coupled to the charging pump 1212. The loop filter 1213 is configured to generate the second control signal VC2 according to the adjustment signal SA and output the second control signal VC2 to the voltage-controlled oscillator 122.

Figure 5:
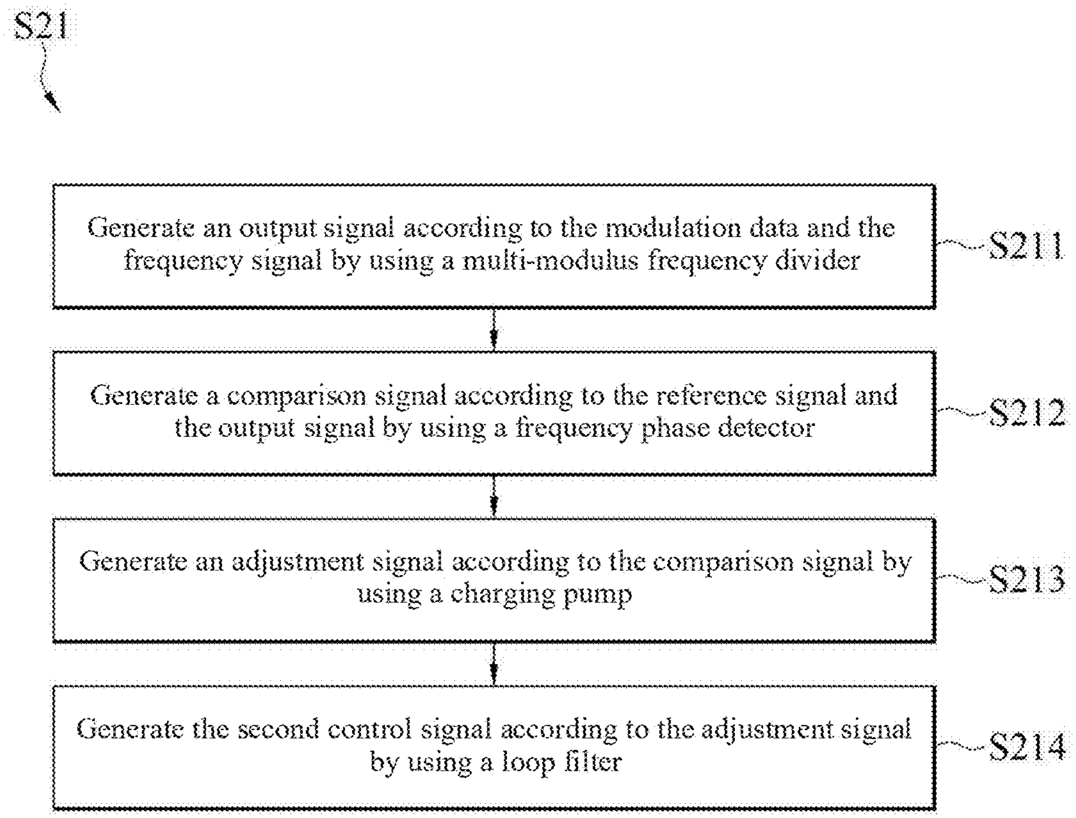
FIG. 5 is a schematic flowchart of step S21 according to an embodiment.

FIG. 5 is a schematic flowchart of step S21 according to an embodiment. Referring to FIG. 3 and FIG. 5, specifically, in step S21, the control circuit 121 performs frequency division on the frequency signal SF according to the modulation data D1 by using the multi-modulus frequency divider 1214 to generate the output signal SO (step S211). Next, the control circuit 121 compares the reference signal SR with the output signal SO by using the frequency phase detector 1211 to detect a phase difference and a frequency difference between the reference signal SR and the output signal SO. The frequency phase detector 1211 generates and outputs the corresponding comparison signal SC to the charging pump 1212 according to the detected phase difference and frequency difference (step S212) such that the charging pump 1212 can obtain the adjustment signal SA with the corresponding voltage size according to the comparison signal SC (step S213). Then, the control circuit 121 filters out high-frequency noise of the adjustment signal SA by using the loop filter 1213 to generate and output the second control signal VC2 to the voltage-controlled oscillator 122 (step S214).

Specifically, in step S212 to step S214, the comparison signal SC generated by the frequency phase detector 1211 may include a charging signal and a discharging signal. The charging signal may be used for making the charging pump 1212 charge the loop filter 1213, and the discharging signal may be used for making the charging pump 1212 discharge the loop filter 1213. For example, when the reference signal SR is ahead of the output signal SO, the frequency phase detector 1211 may generate a charging signal with logic “1” and a discharging signal with logic “0” to the charging pump 1212, so that the charging pump 1212 charges the loop filter 1213 through the adjustment signal SA, thereby generating the second control signal VC2 with a higher potential. When the reference signal SR is behind the output signal SO, the frequency phase detector 1211 may generate a charging signal with logic “0” and a discharging signal with logic “1” to the charging pump 1212, so that the charging pump 1212 discharges the loop filter 1213 through the adjustment signal SA, thereby generating the second control signal VC2 with a lower potential. When the reference signal SR is synchronous with the output signal SO, the frequency phase detector 1211 may generate a charging signal and a discharging signal both with logic “0” to the charging pump 1212, so that the charging pump 1212 does not charge or discharge the loop filter 1213 through the adjustment signal SA, thereby maintaining the potential of the second control signal VC2.

In some aspects, the loop filter 1213 may be implemented as a low-pass filter of any structure, for example, but not limited to, a first-order low-pass filter, a second-order low-pass filter, a third-order low-pass filter or the like.

Referring to FIG. 3, in some embodiments, the control circuit 121 may further include an adder 1215 and a trigonometric integral modulator 1216. The trigonometric integral modulator 1216 is coupled between the multi-modulus frequency divider 1214 and the adder 1215, and the adder 1215 is coupled to the digital input stage (not shown).

Figure 6:
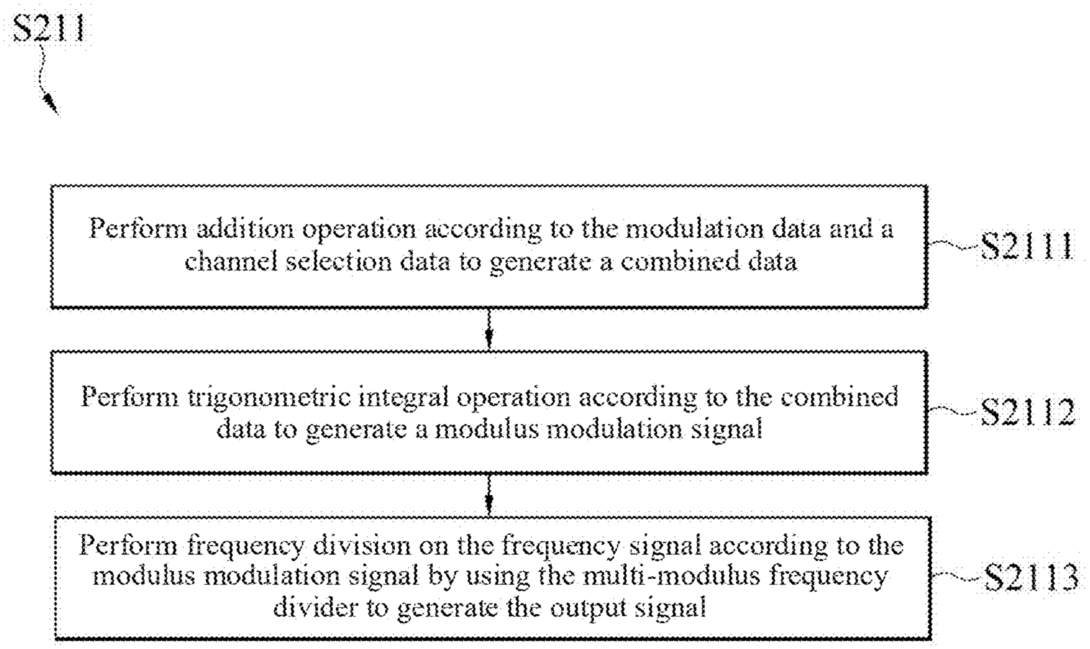
FIG. 6 is a schematic flowchart of step S211 according to an embodiment.

FIG. 6 is a schematic flowchart of step S211 according to an embodiment. Referring to FIG. 3 and FIG. 6, specifically, in step S211, an input terminal of the adder 1215 receives the modulation data D1, another input terminal of the adder 1215 receives a channel selection data D2, and the adder 1215 performs addition operation according to the modulation data D1 and the channel selection data D2 to generate and output a combined data D3 to the trigonometric integral modulator 1216 (step S2111). For example, the adder 1215 may concatenate the channel selection data D2 after the modulation data D1 to form the combined data D3. Next, the trigonometric integral modulator 1216 performs trigonometric integral operation according to the combined data D3 to generate and output a modulus modulation signal SN to the multi-modulus frequency divider 1214 (step S2112). The modulus modulation signal SN is used for controlling a modulus of the multi-modulus frequency divider 1214. Then, the multi-modulus frequency divider 1214 can perform the frequency division on the frequency signal SF according to the modulus corresponding to the modulus modulation signal SN to generate the output signal SO (step S2113).

Figure 7:
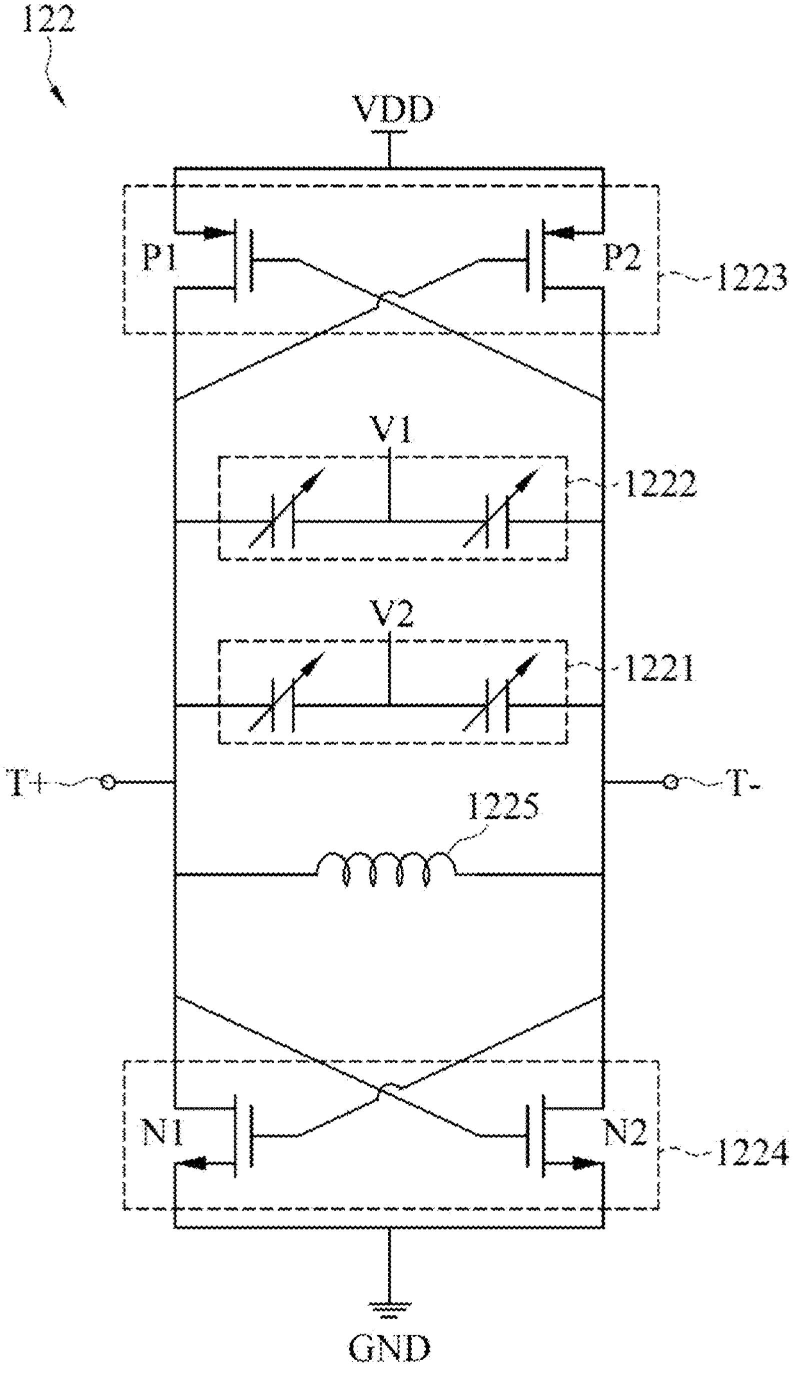
FIG. 7 is a schematic outline diagram of a voltage-controlled oscillator according to an embodiment.

FIG. 7 is a schematic outline diagram of a voltage-controlled oscillator according to an embodiment. Referring to FIG. 7, in some embodiments, the voltage-controlled oscillator 122 may include a coarse adjustment capacitor bank 1221 and a fine adjustment capacitor bank 1222. In addition, the voltage-controlled oscillator 122 may further include a first cross-coupled pair 1223, a second cross-coupled pair 1224, and an inductor 1225.

Referring to FIG. 3 and FIG. 7, in some embodiments, the output terminal of the voltage-controlled oscillator 122 includes a positive output terminal T+ and a negative output terminal T−. The coarse adjustment capacitor bank 1221 is coupled between the positive output terminal T+ and the negative output terminal T−. An adjustable terminal of the coarse adjustment capacitor bank 1221 is coupled to the output terminal of the loop filter 1213 to receive the second control signal VC2 from the loop filter 1213. The coarse adjustment capacitor bank 1221 has a coarse adjustment capacitance, and a size of the coarse adjustment capacitance of the coarse adjustment capacitor bank 1221 is controlled by the second control signal VC2, i.e., generated according to the second control signal VC2. The fine adjustment capacitor bank 1222 is coupled between the positive output terminal T+ and the negative output terminal T−. An adjustable terminal of the fine adjustment capacitor bank 1222 is coupled to the output terminal of the conversion circuit 110 to receive the first control signal VC1 of the conversion circuit 110. The fine adjustment capacitor bank 1222 has a fine adjustment capacitance, and a size of the fine adjustment capacitance of the fine adjustment capacitor bank 1222 is controlled by the first control signal VC1, i.e., generated according to the first control signal VC1. The inductor 1225 is coupled between the positive output terminal T+ and the negative output terminal T−. The first cross-coupled pair 1223 is coupled between the positive output terminal T+ and the negative output terminal T−, and a power supply terminal of the first cross-coupled pair 1223 is coupled to a power supply voltage VDD. The second cross-coupled pair 1224 is coupled between the positive output terminal T+ and the negative output terminal T−, and a power supply terminal of the second cross-coupled pair 1224 is coupled to a ground voltage GND. The first cross-coupled pair 1223, the coarse adjustment capacitor bank 1221, the fine adjustment capacitor bank 1222, the inductor 1225, and the second cross-coupled pair 1224 are connected in parallel with each other. The coarse adjustment capacitor bank 1221, the fine adjustment capacitor bank 1222, and the inductor 1225 that are connected in parallel form an inductor-capacitor oscillator.

In some embodiments, the first cross-coupled pair 1223 includes two P-type transistors P1-P2. Source terminals of the P-type transistors P1 and P2 are both coupled to the power supply voltage VDD. A gate terminal of the P-type transistor P1 is coupled to a drain terminal of the P-type transistor P2, and a gate terminal of the P-type transistor P2 is coupled to a drain terminal of the P-type transistor P1. The drain terminal of the P-type transistor P1 is coupled to the positive output terminal T+, and the drain terminal of the P-type transistor P2 is coupled to the negative output terminal T−. The first cross-coupled pair 1223 is configured to isolate the inductor-capacitor oscillator from the power supply voltage VDD to reduce the frequency pushing effect. In addition, the second cross-coupled pair 1224 includes two N-type transistors N1-N2. Source terminals of the N-type transistors N1 and N2 are both coupled to the ground voltage GND. A gate terminal of the N-type transistor N1 is coupled to a drain terminal of the N-type transistor N2, and a gate terminal of the N-type transistor N2 is coupled to a drain terminal of the N-type transistor N1. The drain terminal of the N-type transistor N1 is coupled to the positive output terminal T+, and the drain terminal of the N-type transistor N2 is coupled to the negative output terminal T−. The second cross-coupled pair 1224 is configured to provide a negative resistance to compensate for loss of the inductor-capacitor oscillator.

Figure 8:
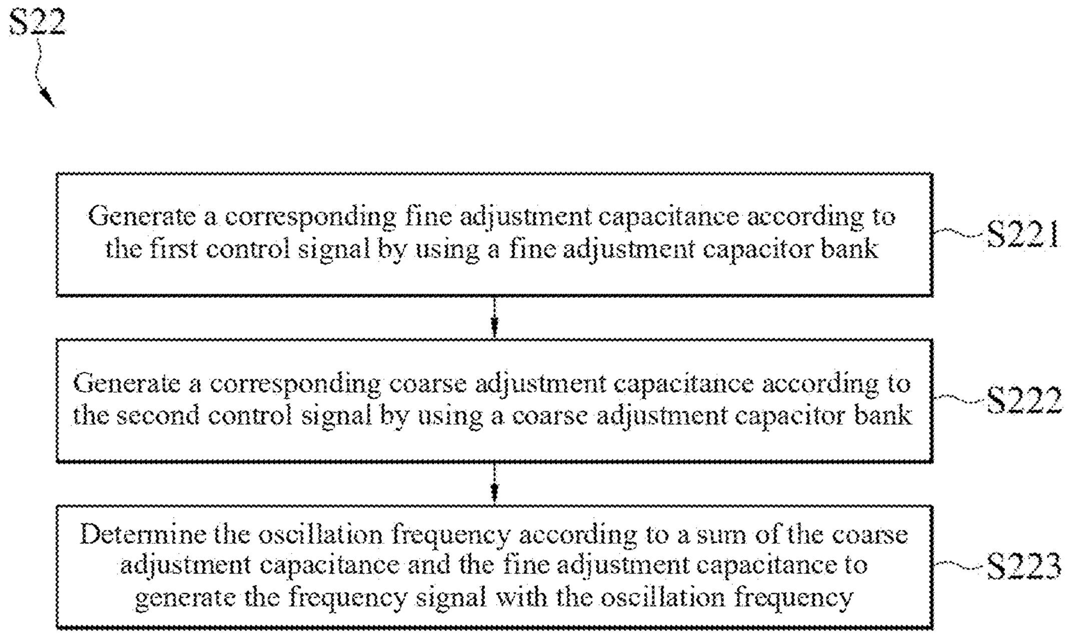
FIG. 8 is a schematic flowchart of step S22 according to an embodiment.

FIG. 8 is a schematic flowchart of step S22 according to an embodiment. Referring to FIG. 7 and FIG. 8, specifically, in step S22, the voltage-controlled oscillator 122 may generate (provide) a corresponding fine adjustment capacitance according to the first control signal VC1 by using the fine adjustment capacitor bank 1222 (step S221), and generate (provide) a corresponding coarse adjustment capacitance according to the second control signal VC2 by using the coarse adjustment capacitor bank 1221 (step S222), so that the voltage-controlled oscillator 122 may determine the oscillation frequency according to a sum of the coarse adjustment capacitance provided by the coarse adjustment capacitor bank 1221 and the fine adjustment capacitance provided by the fine adjustment capacitor bank 1222 to generate the frequency signal SF with the oscillation frequency on the positive output terminal T+ and the negative output terminal T− (step S223). The frequency signal SF is a differential signal formed by a positive frequency signal on the positive output terminal T+ and a negative frequency signal on the negative output terminal T−. The oscillation frequency of the frequency signal SF is related to the sum of the coarse adjustment capacitance and the fine adjustment capacitance. In some aspects, the oscillation frequency of the frequency signal SF is inversely proportional to the sum of the coarse adjustment capacitance and the fine adjustment capacitance.

In some embodiments, the adjustment of the coarse adjustment capacitance of the coarse adjustment capacitor bank 1221 by the second control signal VC2 is used for switching the working frequency of the transceiver device 100 (e.g., from the first channel to the last channel in the transmission band). The adjustment of the fine adjustment capacitance of the fine adjustment capacitor bank 1222 by the first control signal VC1 is used for switching the operating mode of the transceiver device 100 (e.g., from the transmitter mode to the receiver mode) or for fine-tuning the working frequency of the transceiver device 100.

Referring to FIG. 1 and FIG. 2 again, in some embodiments, when the mode signal SM indicates that the operating mode of the transceiver device 100 is the transmitter mode, the transceiver device 100 performs step S30 and step S40. In addition, the modulation data D1 in this case includes transmission data to be transmitted. When the mode signal SM indicates that the operating mode of the transceiver device 100 is the receiver mode, the transceiver device 100 performs step S50 and step S60. In addition, the modulation data D1 in this case includes frequency adjustment data for switching from the transmitter mode to the receiver mode.

Figure 9:
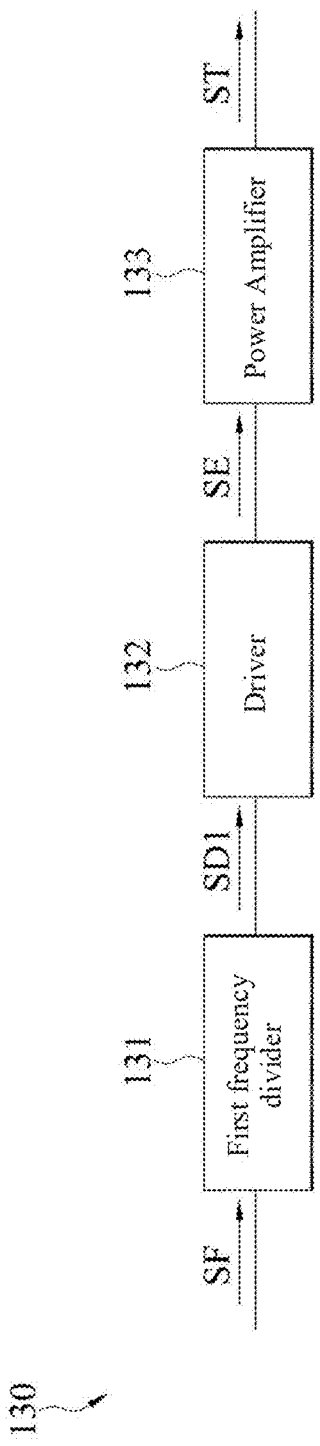
FIG. 9 is a schematic block diagram of a transmission processing circuit according an embodiment.

FIG. 9 is a schematic outline diagram of the transmission processing circuit 130 according an embodiment. Referring to FIG. 1 and FIG. 9, in some embodiments, the transmission processing circuit 130 includes a first frequency divider 131, a driver 132, and a power amplifier 133. An input terminal of the first frequency divider 131 is coupled to a first connecting terminal of the selection circuit 150. The driver 132 is coupled between an output terminal of the first frequency divider 131 and an input terminal of the power amplifier 133. An output terminal of the power amplifier 133 is coupled to a first switching terminal of the switching circuit 170.

Figure 10:
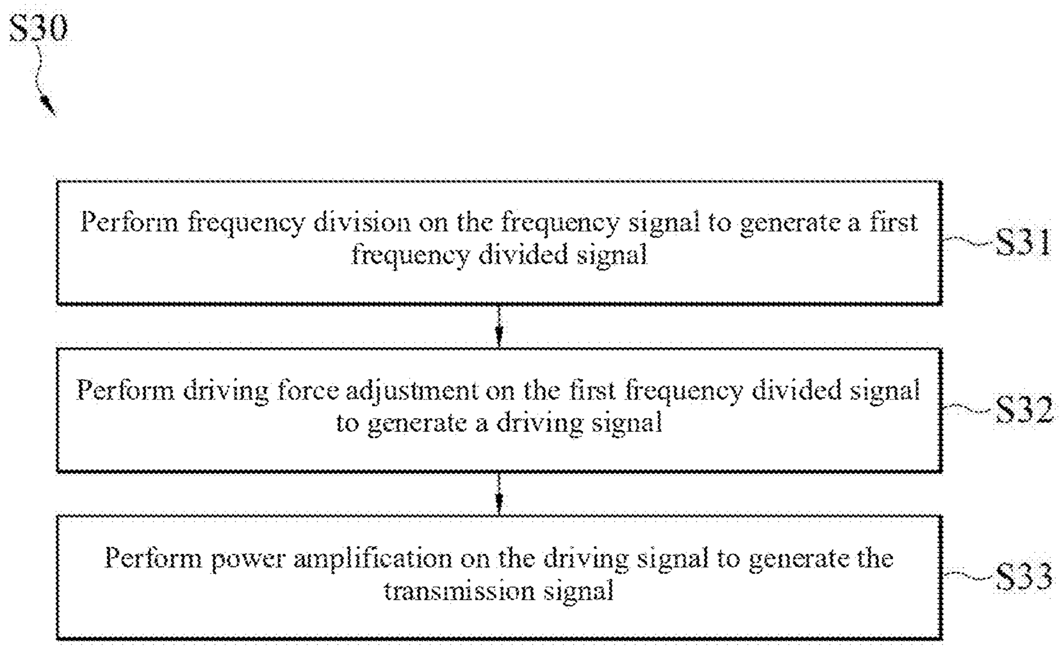
FIG. 10 is a schematic flowchart of step S30 according to an embodiment.

FIG. 10 is a schematic flowchart of step S30 according to an embodiment. Referring to FIG. 9 and FIG. 10, specifically, in the transmission processing of step S30, the transmission processing circuit 130 performs frequency division on the frequency signal SF by using the first frequency divider 131 to generate a first frequency divided signal SD1 (step S31). Next, the transmission processing circuit 130 performs driving force adjustment on the first frequency divided signal SD1 (e.g., enhances driving ability of the signal) by using the driver 132 to generate a driving signal SE (step S32). Then, the transmission processing circuit 130 performs power amplification on the driving signal SE by using the power amplifier 133 to generate the transmission signal ST (step S33).

Figure 11:
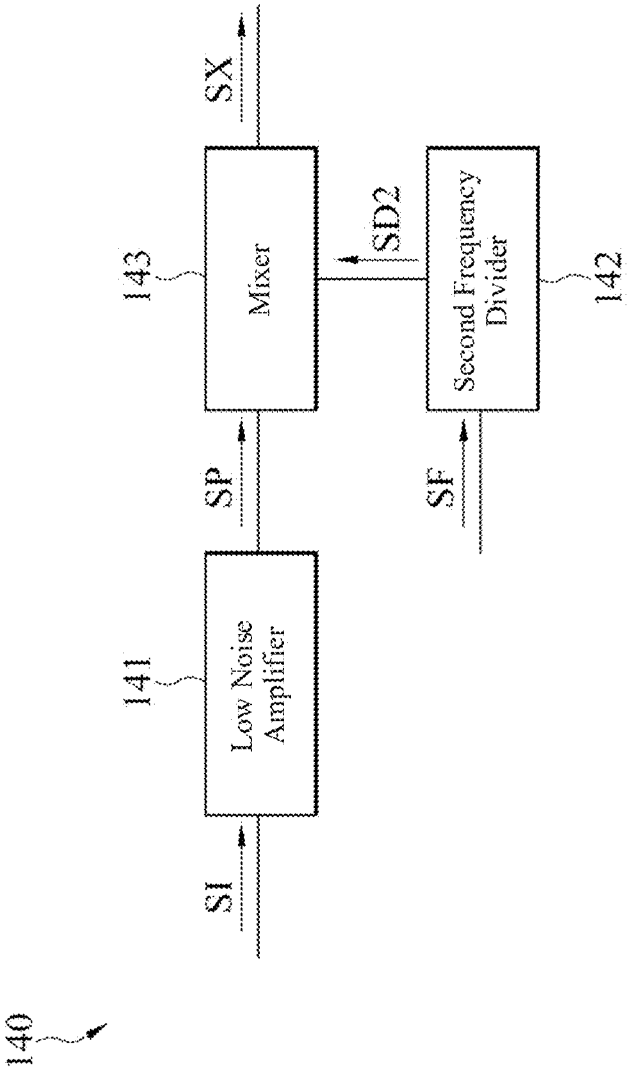
FIG. 11 is a schematic block diagram of a reception processing circuit according an embodiment.

FIG. 11 is a schematic block diagram of a reception processing circuit according an embodiment. Referring to FIG. 1 and FIG. 11, in some embodiments, the reception processing circuit 140 includes a low noise amplifier 141, a second frequency divider 142 and a mixer 143. An input terminal of the low noise amplifier 141 is coupled to a second switching terminal of the switching circuit 170. An input terminal of the second frequency divider 142 is coupled to a second connecting terminal of the selection circuit 150. An input terminal of the mixer 143 is coupled to an output terminal of the low noise amplifier 141, and another input terminal of the mixer 143 is coupled to an output terminal of the second frequency divider 142. In addition, an output terminal of the mixer 143 is coupled to a post-stage circuit (not shown).

Figure 12:
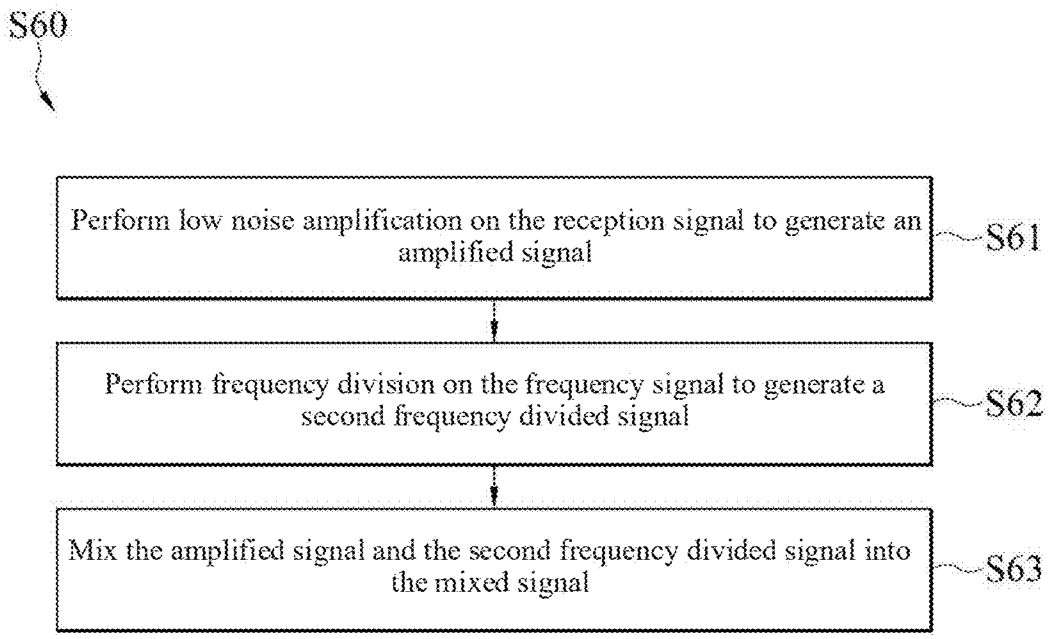
FIG. 12 is a schematic flowchart of step S60 according to an embodiment.

FIG. 12 is a schematic flowchart of step S60 according to an embodiment. Referring to FIG. 11 and FIG. 12, specifically, in the reception processing of step S60, the reception processing circuit 140 performs low noise amplification on the reception signal SI received via the antenna 160 by using the low noise amplifier 141 to generate an amplified signal SP (step S61), and the reception processing circuit 140 performs frequency division on the frequency signal SF from the voltage-controlled oscillator 122 by using the second frequency divider 142 to generate a second frequency divided signal SD2 (step S62). Then, the reception processing circuit 140 performs mixing according to the amplified signal SP and the second frequency divided signal SD2 by using the mixer 143 to generate a mixed signal SX to the post-stage circuit, for example, but not limited to, a baseband circuit (step S63).

Based on the above, according to the transceiver device 100 and the transceiver method in any embodiment, the oscillation frequency of the voltage-controlled oscillator 122 is adjusted according to the first control signal VC1 generated according to the modulation data D1 by the conversion circuit 110 and the second control signal VC2 generated according to the modulation data D1 by the control circuit 121, so that the phase-locked loop 120 can be locked more quickly. In this way, the transceiver device 100 can quickly switch its working frequency and/or operating mode in a wide transmission band range.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. A transceiver device, comprising:

a conversion circuit, configured to perform a digital-to-analog conversion according to a modulation data to generate a first control signal;

a phase-locked loop, configured to generate a frequency signal according to the modulation data, the first control signal, and a reference signal, wherein the phase-locked loop comprises:

a control circuit, configured to generate a second control signal for frequency adjustment according to the modulation data, the reference signal, and the frequency signal; and a voltage-controlled oscillator, configured to determine an oscillation frequency according to the first control signal and the second control signal to generate the frequency signal with the oscillation frequency;

a transmission processing circuit, configured to perform a transmission processing according to the frequency signal;

a reception processing circuit, configured to perform a reception processing according to the frequency signal; and a selection circuit, configured to selectively transmit the frequency signal to the transmission processing circuit or the reception processing circuit.

2. The transceiver device according to claim 1, wherein the control circuit comprises:

a frequency phase detector, configured to generate a comparison signal according to the reference signal and an output signal;

a charging pump, configured to generate an adjustment signal according to the comparison signal;

a loop filter, configured to generate the second control signal according to the adjustment signal; and a multi-modulus frequency divider, configured to generate the output signal according to the frequency signal and the modulation data.

3. The transceiver device according to claim 2, wherein the control circuit further comprises:

an adder, configured to generate a combined data according to the modulation data and a channel selection data; and a trigonometric integral modulator, configured to generate a modulus modulation signal according to the combined data;

wherein the multi-modulus frequency divider performs frequency division on the frequency signal according to the modulus modulation signal to generate the output signal.

4. The transceiver device according to claim 1, wherein the voltage-controlled oscillator comprises:

a coarse adjustment capacitor bank, configured to generate a corresponding coarse adjustment capacitance according to the second control signal; and a fine adjustment capacitor bank, configured to generate a corresponding fine adjustment capacitance according to first control signal;

wherein the oscillation frequency of the frequency signal is related to a sum of the corresponding coarse adjustment capacitance and the corresponding fine adjustment capacitance.

5. The transceiver device according to claim 4, wherein the voltage-controlled oscillator further comprises:

a first cross-coupled pair, coupled to a power supply voltage;

a second cross-coupled pair, coupled to a ground voltage; and an inductor, wherein the first cross-coupled pair, the fine adjustment capacitor bank, the coarse adjustment capacitor bank, the inductor, and the second cross-coupled pair are connected in parallel with each other.

6. The transceiver device according to claim 1, further comprising:

an antenna, configured to receive a reception signal or transmit a transmission signal; and a switching circuit, configured to selectively connect the antenna to the reception processing circuit or the transmission processing circuit.

7. The transceiver device according to claim 6, wherein the selection circuit transmits the frequency signal to the transmission processing circuit in response to a mode signal indicating that an operating mode of the transceiver device is a transmitter mode such that the transmission processing circuit performs the transmission processing according to the frequency signal to generate the transmission signal, and the switching circuit connects the antenna to the transmission processing circuit in response to the mode signal indicating that the operating mode of the transceiver device is the transmitter mode such that the transmission processing circuit transmits the transmission signal via the antenna.

8. The transceiver device according to claim 7, wherein the transmission processing circuit comprises:

a first frequency divider, configured to perform frequency division on the frequency signal to generate a first frequency divided signal;

a driver, configured to perform driving force adjustment on the first frequency divided signal to generate a driving signal; and a power amplifier, configured to perform power amplification on the driving signal to generate the transmission signal, and output the transmission signal to the antenna so as to transmit the transmission signal via the antenna.

9. The transceiver device according to claim 6, wherein the switching circuit connects the antenna to the reception processing circuit in response to a mode signal indicating that an operating mode of the transceiver device is a receiver mode such that the reception processing circuit receives the reception signal via the antenna, and the selection circuit transmits the frequency signal to the reception processing circuit in response to the mode signal indicating that an operating mode of the transceiver device is the receiver mode such that the reception processing circuit performs the reception processing on the reception signal according to the frequency signal.

10. The transceiver device according to claim 9, wherein the reception processing circuit comprises:

a low noise amplifier, configured to perform low noise amplification on the reception signal from the antenna to generate an amplified signal;

a second frequency divider, configured to perform frequency division on the frequency signal to generate a second frequency divided signal; and a mixer, configured to generate a mixed signal according to the amplified signal and the second frequency divided signal.

11. A transceiver method, comprising:

performing a digital-to-analog conversion on a modulation data to generate a first control signal;

generating a second control signal for frequency adjustment according to a reference signal, a frequency signal, and the modulation data by using a control circuit of a phase-locked loop;

determining an oscillation frequency according to the first control signal and the second control signal by using a voltage-controlled oscillator of the phase-locked loop to generate the frequency signal with the oscillation frequency; and transmitting the frequency signal to a transmission processing circuit to perform a transmission processing according to the frequency signal by using the transmission processing circuit, or transmitting the frequency signal to a reception processing circuit to perform a reception processing according to the frequency signal by using the reception processing circuit.

12. The transceiver method according to claim 11, wherein the step of generating the second control signal for the frequency adjustment comprises:

generating an output signal according to the frequency signal and the modulation data by using a multi-modulus frequency divider of the control circuit;

generating a comparison signal according to the reference signal and the output signal by using a frequency phase detector of the control circuit;

generating an adjustment signal according to the comparison signal by using a charging pump of the control circuit; and generating the second control signal according to the adjustment signal by using a loop filter of the control circuit.

13. The transceiver method according to claim 12, wherein the step of generating the output signal comprises:

performing addition operation according to the modulation data and a channel selection data to generate a combined data;

performing trigonometric integral operation according to the combined data to generate a modulus modulation signal; and performing frequency division on the frequency signal according to the modulus modulation signal by using the multi-modulus frequency divider to generate the output signal.

14. The transceiver method according to claim 11, wherein the step of generating the frequency signal with the oscillation frequency comprises:

generating a corresponding fine adjustment capacitance according to the first control signal by using a fine adjustment capacitor bank of the voltage-controlled oscillator;

generating a corresponding coarse adjustment capacitance according to the second control signal by using a coarse adjustment capacitor bank of voltage-controlled oscillator; and determining the oscillation frequency according to a sum of the coarse adjustment capacitance and the fine adjustment capacitance by using the voltage-controlled oscillator to generate the frequency signal with the oscillation frequency.

15. The transceiver method according to claim 14, wherein the voltage-controlled oscillator further comprises:

a first cross-coupled pair, coupled to a power supply voltage;

a second cross-coupled pair, coupled to a ground voltage; and an inductor, wherein the first cross-coupled pair, the fine adjustment capacitor bank, the coarse adjustment capacitor bank, the inductor, and the second cross-coupled pair are connected in parallel with each other.

16. The transceiver method according to claim 11, further comprising:

connecting an antenna to the reception processing circuit, or connecting the antenna to the transmission processing circuit.

17. The transceiver method according to claim 16, further comprising:

performing the step of connecting the antenna to the transmission processing circuit and the step of transmitting the frequency signal to the transmission processing circuit according to a mode signal indicating that an operating mode is a transmitter mode such that the transmission processing circuit performs the transmission processing according to the frequency signal to generate a transmission signal and transmits the transmission signal via the antenna.

18. The transceiver method according to claim 17, wherein the transmission processing comprises:

performing frequency division on the frequency signal to generate a first frequency divided signal;

performing driving force adjustment on the first frequency divided signal to generate a driving signal; and performing power amplification on the driving signal to generate the transmission signal.

19. The transceiver method according to claim 16, further comprising:

performing the step of connecting the antenna to the reception processing circuit and the step of transmitting the frequency signal to the reception processing circuit according to a mode signal indicating that an operating mode is a receiver mode such that the reception processing circuit receives a reception signal via the antenna and performs the reception processing on the reception signal according to the frequency signal.

20. The transceiver method according to claim 19, wherein the reception processing comprises:

performing low noise amplification on the reception signal to generate an amplified signal;

performing frequency division on the frequency signal to generate a second frequency divided signal; and mixing the amplified signal and the second frequency divided signal into a mixed signal.

* * * * *